H. N. PACKARD.
ELECTRICAL RESISTANCE UNIT.
APPLICATION FILED JULY 29, 1913.
1,218,205.
Patented Mar. 6, 1917.
2 SHEETS—SHEET 1.
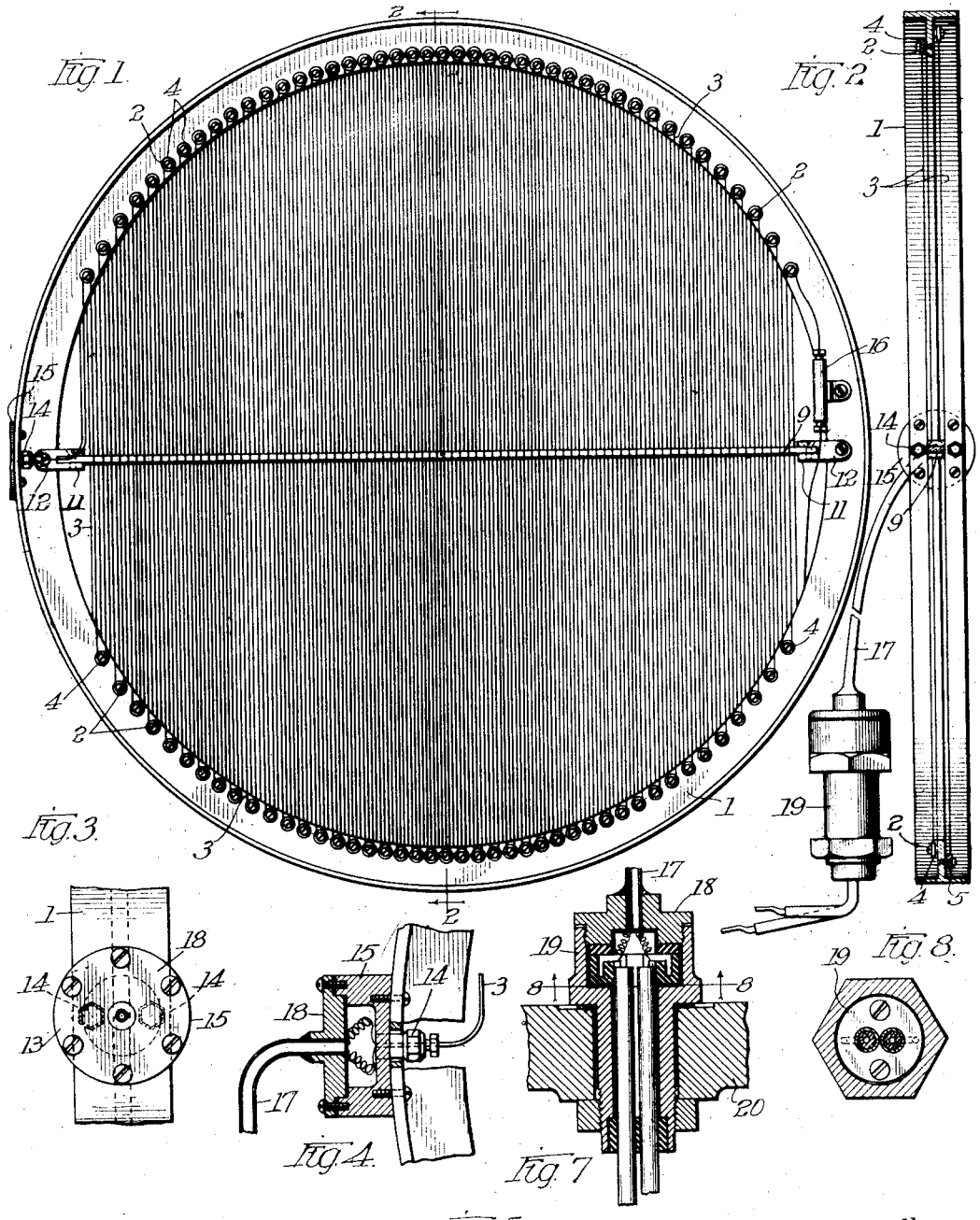
Witnesses:
Robert F. Weir
Geo. B. Jones
Inventor
HORACE N. PACKARD
By Edwin B. H. Tower, Jr.
Atty.

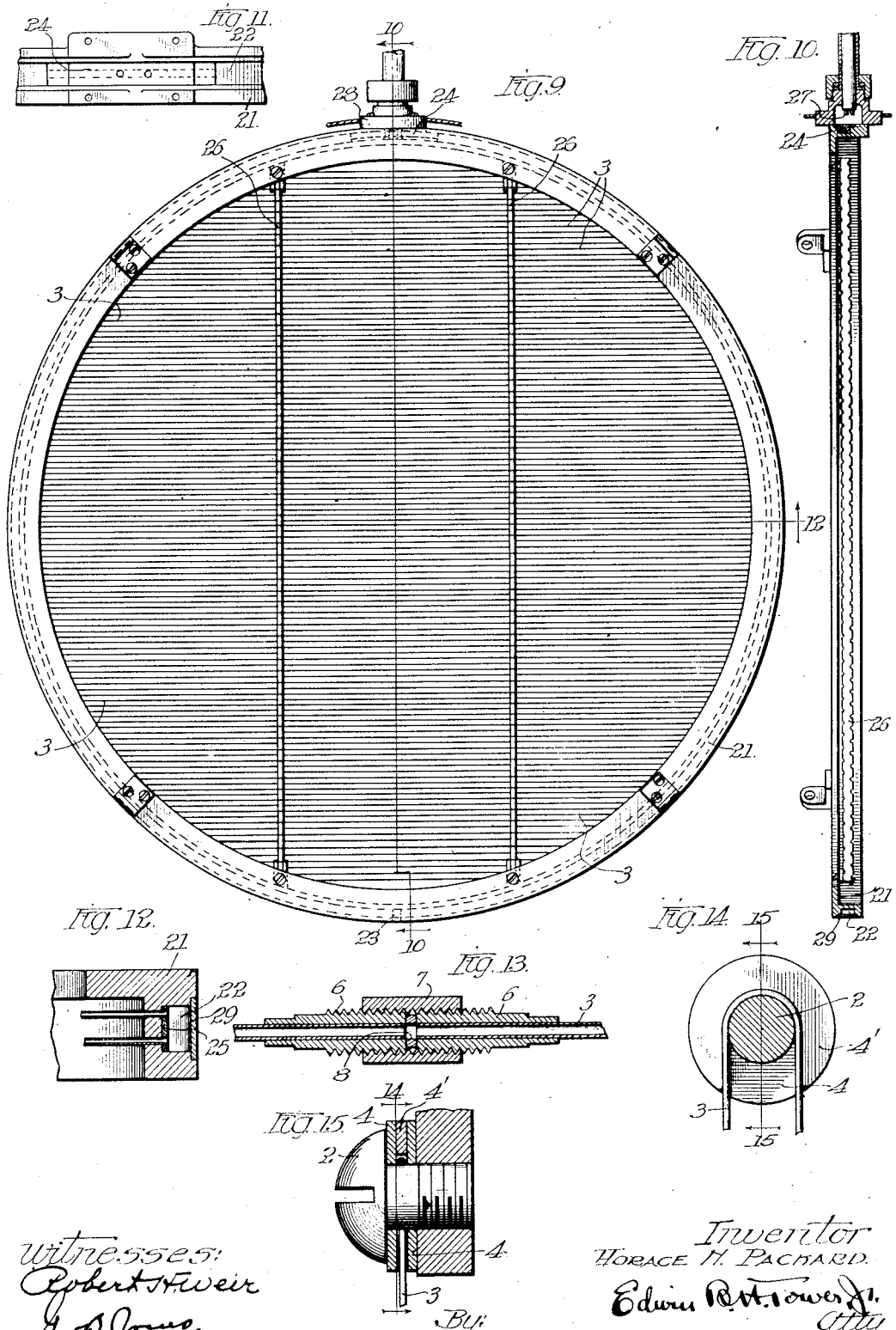

UNITED STATES PATENT OFFICE.

HORACE N. PACKARD, OF MILWAUKEE, WISCONSIN, ASSIGNOR TO THE CUTLER-HAMMER MFG. CO., OF MILWAUKEE, WISCONSIN, A CORPORATION OF WISCONSIN.

ELECTRICAL RESISTANCE UNIT.

1,218,205.          Specification of Letters Patent.        Patented Mar. 6, 1917.

Application filed July 29, 1913. Serial No. 781,733.

*To all whom it may concern:*

Be it known that I, HORACE N. PACKARD, a citizen of the United States, residing at Milwaukee, in the county of Milwaukee and State of Wisconsin, have invented new and useful Improvements in Electrical Resistance Units, of which the following is a full, clear, concise, and exact description, reference being had to the accompanying drawing, forming a part of this specification.

My invention relates to improvements in electrical resistance units and applies particularly to electrical resistance thermometers.

Thermometers of the above general type have been developed in connection with apparatus for measuring the flow of fluids by a method, which briefly stated, consists in imparting heat to the flowing stream of fluid preferably from an electric heater and in measuring the temperature rise of the fluid due to such heating. Electric resistance thermometers are used for determining the temperature of the fluid before and after heating. Such thermometers have usually consisted heretofore of a bare uninsulated resistance wire wound or strung on a suitable frame and insulated therefrom. The resistance wire, under these circumstances, is subjected directly to and is in contact with the flowing stream of fluid, whereby the temperature of said wire varies with that of said stream, being at all times substantially the same as that of said stream. Its resistance varies with its temperature, and, hence, affords a basis for determining the temperature of the fluid.

With certain kinds of gases and other fluids it is undesirable to permit the resistance wire to be brought into direct contact with the flowing stream, as said wire may be affected thereby both mechanically and chemically. Under such conditions it is also very difficult to maintain insulation between different parts or loops of the wire, or between the wire and the supporting frame if deposits of conducting material or of water are formed on the unit, or in case the gas or fluid flowing past the unit is not entirely dry. It is also often desirable to use a resistance material having such high resistance per unit length that the cross section thereof is necessarily very small. It is, therefore, easily damaged mechanically.

My invention is directed more particularly to obviating the difficulties arising from such direct contact between the resistance material and the flowing stream, and to providing a more rugged unit.

The objects of my invention, stated more fully, are:

To provide an improved resistance which may be used as a resistance thermometer in which the resistance material is protected from the deleterious action of the surrounding medium.

To provide a rugged resistance unit which may be used as a resistance thermometer and in which may be employed a resistance material of high resistance per unit length.

To provide a resistance which may be used as a resistance thermometer in which the ohmic resistance of the resistance material shall remain constant even when moisture is brought into contact with the unit or when conducting material has been deposited thereon.

To provide a resistance which may be used as a resistance thermometer in which the insulation resistance between the resistance material and the supporting frame shall be as high as possible and shall be as nearly constant as possible under severe conditions of service.

To provide a resistance material of very high ohmic resistance, suitably incased in a protecting tubing which permits of its being supported in spans of considerable length.

To provide a fine, continuous resistor so protected and inclosed within a tubing from which it is insulated that it may be mounted directly on metal supports without further insulation, and may have its casing protected by a non-corrosive plating, whereby said resistor may be located in any desired medium without deterioration.

To provide a resistance unit in which the above results are attained without offering any substantial obstruction to the flow of the fluid and without impairing the ability of the resistance material to change its temperature and hence its resistance quickly with changes in the temperature of the surrounding medium.

Other objects and advantages of the invention will hereinafter appear.

In the accompanying drawings I have illustrated two forms which the invention may assume. The invention is not limited to the constructions illustrated, however, but it may be embodied in other forms.

In the drawings, Figure 1 is an elevation of the preferred form of resistance thermometer;

Fig. 2 is a sectional elevation thereof on the line 2—2 of Fig. 1;

Fig. 3 is an enlarged end elevation of a terminal box;

Fig. 4 is a central, sectional elevation thereof;

Fig. 5 is a plan view of the central stiffening bar;

Fig. 6 is an enlarged cross-section of the resistance wire and its inclosing tube;

Fig. 7 is an enlarged sectional elevation of a terminal plug;

Fig. 8 is a section on the line 8—8 of Fig. 7;

Fig. 9 is an elevation of a modified form of resistance thermometer.

Fig. 10 is a central, sectional elevation thereof on the line 10—10 of Fig. 9;

Fig. 11 is an enlarged view of part of the supporting frame;

Fig. 12 is an enlarged section on the line 12—12 of Fig. 9;

Fig. 13 is an enlarged, longitudinal section of one of the couplings for adjacent lengths of tubing; and Figs. 14 and 15 are enlarged views showing special forms of washers employed.

The resistance thermometer in its preferred form comprises a suitable metallic ring 1 of T section. Mounted on the inner flange of said supporting ring are a large number of screws 2 received within screw threaded openings therein. Said screws may be arranged on one or both sides of said flange, as shown in Fig. 2, the screws being spaced substantially equally around the greater portion of the ring. A fine tube 3, preferably of metal, is strung back and forth across the supporting ring, being bent around the respective screws and spaced from said flange and from the heads of the screws by suitable washers 4, 4'. A tubing made of steel has been found suitable for this purpose since it has good heat conductivity and when covered with a thin coating of gold or the like resists the corrosive action of the gases. The washers, as will be apparent from Figs. 13 and 14, are so constructed and arranged that the tubing may be held firmly in place, but cannot be crushed when the head of the screw brings pressure against the washers.

Prior to the mounting of the steel tube in the manner shown, an insulated resistance wire 5 is drawn through it. The resistance wire is provided preferably with a silk insulation, although it may be otherwise insulated. Inasmuch as it is difficult to obtain the tubing in lengths as great as the resistance material needs to be in some cases, it is desirable to splice said tubing at intervals. This may be effected by using a small coupling such as shown in Fig. 13. In this figure each end of the tube 3 is sweated into a screw threaded sleeve 6, the latter being connected by a screw threaded nut 7, said nut and said sleeves being made preferably of metal. Said sleeves are drawn together against a small washer or gasket 8. Thus the desired length of insulated resistance wire is incased in a thin capillary tubing which is not only very flexible, but of very small mass.

In order that the transfer of heat from the surrounding medium to the resistance material may be as rapid as possible, it is desirable that there shall be no air space within the tube. Accordingly the air is exhausted from the tube and a suitable insulating compound such as paraffin, for example, is forced into the clear space between the wire and the tube so as to fill completely the space and to impregnate thoroughly the insulating material on the wire.

The resistance wire thus incased is then wound back and forth around the screws previously described, forming parallel, longitudinal spans across the supporting ring. A suitable metal support 9 is provided to prevent distortion of the spans and to give the ring greater rigidity. Said support consists of a flat metal bar having notches 10 in opposite edges thereof to receive the spans of steel tubing, said notches being preferably arranged in staggered relation as shown. Said supporting bar, of which there may be one or more, may be secured to the frame in various ways. In Fig. 5 the ends are shown as fitting within slots in bifurcated blocks 11 which are suitably secured to the inner flange of the ring by screws 12. The spans of tubing are held in said notches preferably by small tie wires 13 as shown in Fig. 5, said wires being tied around the bar and tubing.

The free ends of the incased wire resistance are passed through small stuffing boxes 14 into a terminal box 15. An additional stuffing box 16 is mounted on the frame, and receives an intermediate portion of the tubing, whereby the incased wire may be made in two sections and joined electrically in said box. Within the terminal box the resistance wire is connected to leads which pass out preferably through a flexible tube 17. The details of said terminal box will be apparent from an inspection of Figs. 3 and 4. Said box is provided with a removable cover 18, to which said flexible tube 17 is secured, the latter being connected also to the terminal plug 19, shown in Figs. 2, 7 and 8. Said plug passes through the housing 20 of the meter and prevents the escape of gas around the leads. Under certain conditions, the leads within the flexible tube may be incased in small tubes to prevent chafing.

After the unit has been assembled, as described above, the entire structure may be plated with some material, such as nickel, to prevent any chemical action or other corrosive action, or the tubing alone may be plated before being wound on the frame with some other material such as gold.

In the construction shown in Figs. 9, 10 and 11, the supporting ring 21 has a suitable groove 22 machined in its periphery. Two partitions 23 and 24 divide said groove into two header spaces. Capillary steel tubes 3 are strung across the ring at suitable intervals, said tubes passing through suitable openings drilled in said ring, their ends being open and terminating within said grooves. Said open ends project somewhat into said groove and are flared out slightly. They are also embedded in a layer of solder 25, as shown in Fig. 12. The spans of tubing are supported at one or more points by a suitable notched supporting bar or bars 26 similar to those previously described.

The resistance wire, which is an insulated wire similar to that previously described, is threaded back and forth through the steel tubes, the bends in the wire being within the groove. The ends of the wire are brought out adjacent to suitable terminals 27 within a small outlet box 28 on the ring 21. A metallic band 29 is preferably soldered around the groove so that the whole of the resistance element is incased within airtight walls, thereby forming two closed headers communicating with each other through the block 24 and having small tubes passing from one to the other as shown. An opening is preferably tapped into each header space at some suitable point and an air pump attached to one of said spaces, whereby air is exhausted from the inclosed system, including the air within the tubes and surrounding the insulated wire. In the meantime the surrounding medium is preferably raised to a high temperature and a hot impregnating insulating compound is allowed to enter one of the headers and be drawn through all of the tubes into the other header, whereby all the free space in the entire structure is completely filled with said insulating compound. If necessary, pressure may be applied to force said compound into the remote spaces. This structure also is preferably plated to prevent corrosive action thereon.

In both the constructions described above, it will be seen that the steel tubing is very fine, and, hence, offers a minimum resistance to the flow of fluid. Said tubes are spaced uniformly across the entire area, whereby they assume a temperature representing the average temperature of the entire cross section of the stream. The resistance wire being encased within the steel tubing is protected from direct contact with the gas or other fluid and does not deteriorate or vary its resistance when moisture or other material is deposited on the steel tubes. Furthermore, said resistance responds quickly to changes of temperature of the surrounding medium and there is only a slight drop in heat potential, because of the absence of air spaces surrounding the wire. The resistance wire is thoroughly insulated from all the metal parts by virtue not only of its fabric cover, but also by virtue of the insulation compound with which it is surrounded. Accordingly the metal tubing may be mounted directly on metal supports without requiring further insulation, which latter, in the case of a meter, would involve additional parts offering obstruction to the flow of fluid. Because of this absence of insulation between the tubing and the frame, the thermometer as a whole may be of very light mass. The metallic tubing acts not only as a protection for the fine, hair-like resistance wire, but permits said wire to be strung in spans considerably longer than could be employed if said wire were not incased. By the use of longer spans the number of intermediate supports for the resistance is decreased, still further simplifying the construction of the thermometer and insuring a minimum resistance to the flow of fluid. The resistance wire, its inclosing tubing, and the interposed insulation all being flexible, the unit thus formed may be bent or deformed almost in any desired manner without impairing the insulation or the resistor proper.

It is to be understood, of course, that while the resistor has been described particularly with reference to a thermometer adapted for use in a particular kind of meter, it is by no means limited to such use. Furthermore, various changes may be made in the form and construction of the two embodiments of the invention described and illustrated. Accordingly I desire to cover in the appended claims whatever modifications of the invention fall within the scope of said claims.

Having thus described my invention, what I claim as new and desire to secure by Letters Patent of the United States is—

1. A resistance thermometer unit comprising a frame adapted to be mounted in a conduit and a resistor mounted on said frame and disposed substantially uniformly over the area inclosed thereby, said resistor comprising a fine wire of a high ohmic resistance contained in and insulated from a flexible metallic casing.

2. A resistance thermometer unit comprising in combination a supporting frame and a resistor mounted on said frame and disposed substantially uniformly over the area inclosed thereby, said resistor comprising a flexible resistance wire contained in a flexible supporting and protecting casing, the wire being insulated from the casing so that the resistor may be mounted on the supporting frame without further insulating it therefrom.

3. A resistance thermometer unit having a resistor comprising a flexible resistance wire of high ohmic resistance, an air-tight flexible metallic casing for said wire, insulating material filling the space between the wire and casing, a supporting frame adapted to be mounted in a meter housing or conduit and means on said frame over which the resistor is wound so that said resistor is distributed over substantially the entire area inclosed by said frame.

4. A resistance thermometer unit having a resistor comprising a flexible resistance wire, a flexible metallic casing therefor, insulating material filling the space between the wire and the casing, a supporting frame adapted to be mounted in a meter housing or conduit, means on said frame over which the resistor is wound so that said resistor is distributed over substantially the entire area inclosed by said frame, and a stuffing box carried by said frame for receiving said casing whereby the terminals of the resistance wire may be led to the exterior of the frame.

5. A resistance thermometer unit having a resistor comprising a flexible resistance wire, a flexible metallic casing therefor, insulating material filling the space between the wire and the casing, a supporting frame adapted to be mounted in a meter housing or conduit, means on said frame over which the resistor is wound so that said resistor is distributed over substantially the entire area inclosed by said frame, a stuffing box carried by said frame for receiving said casing whereby the terminals of the resistance wire may be led to the exterior of the frame, and a terminal box carried by said frame on the exterior thereof to provide means for connecting the resistance wire terminals to electrical conductors.

6. A resistance thermometer unit having a resistor comprising a flexible resistance wire, a flexible metallic casing therefor, insulating material filling the space between the wire and the casing, a supporting frame adapted to be mounted in a meter housing or conduit, means on said frame over which the resistor is wound so that said resistor is distributed over substantially the entire area inclosed by said frame, a stuffing box carried by said frame for receiving said casing whereby the terminals of the resistance wire may be led to the exterior of the frame, a terminal box carried by said frame on the exterior thereof to provide means for connecting the resistance wire terminals to electrical conductors, a flexible metallic casing connected to said terminal box, and a terminal connection connected to said flexible casing, said terminal connections being adapted to be mounted in a meter housing to provide a gas-tight exit for the thermometer unit leads.

7. A resistance thermometer unit comprising a supporting frame adapted to be mounted in a meter housing, a resistor supported by said frame, said resistor comprising a fine resistance wire, a flexible inclosing casing of small diameter for said wire, insulating material filling the entire space between the wire and the casing thereby excluding air from said casing and thoroughly insulating the wire, whereby a flexible resistor is provided which may be readily wound upon a frame and which is readily responsive to temperature changes in the medium surrounding the casing.

8. A resistance thermometer unit comprising a supporting frame adapted to be mounted in a meter housing, a resistor supported by said frame, said resistor comprising a resistance wire, a flexible inclosing casing of small diameter for said wire, insulating material filling the space between the wire and the casing, and a stuffing box carried by said frame for receiving said casing whereby said wire may be led to the exterior of said frame and insulating material confined within the casing.

9. A resistance thermometer unit comprising in combination a frame adapted to be mounted in a meter housing, a capillary supporting tube carried by said frame, a fine insulated resistance wire in said tube, the tensile strength of said tube permitting the strands of fine resistance wire to be supported in longer spans than if not incased therein.

10. In an electric resistance thermometer, a metal capillary tube, a supporting frame, a resistance wire within said tube, the latter being looped back and forth across said frame, and terminal connections carried by said frame to which the ends of said resistance wire are connected.

11. In an electric resistance thermometer, a resistance element, and a metallic housing inclosing said element, said housing being closed at all points, providing an air-tight construction whereby air may be excluded therefrom.

12. In a resistance thermometer, a plurality of substantially parallel spans of resistance, a terminal box, terminal members, thin metallic inclosures for said resistance spans closely surrounding the same, and a supporting frame for said elements, said inclosure communicating with said terminal box, both of which are air-tight and said resistance being connected to said terminals.

13. A resistance thermometer, comprising a supporting frame, a terminal chamber thereon, a resistance wire having its ends received within said chamber, said wire being looped back and forth across said frame, the said wire being completely incased throughout its length, and said casing communicating with said chamber.

14. A resistance thermometer, comprising a metallic hoop, a flange thereon in the plane of said hoop, a plurality of pins projecting from said flange, a capillary steel tubing looped back and forth around said pins, and a resistance wire incased within said tubing and insulated therefrom.

15. A resistance thermometer, comprising a metallic hoop, a flange thereon in the plane of said hoop, a plurality of pins projecting from opposite sides of said flange, a steel tubing looped back and forth around said pins and on both sides of said flange, a resistance wire incased within said tubing and insulated therefrom, and a stiffening bar carried by said frame and provided with notches within which the spans of tubing are received.

16. In a resistance thermometer, a plurality of sections of steel tubing, a screw threaded sleeve secured to adjacent ends of said tubing, a nut for holding adjacent sleeves together, and a washer interposed between said sleeves whereby an air-tight connection is provided for adjacent lengths of said tubing.

17. A resistance thermometer comprising a metal frame, a resistance wire in an air-tight casing supported on said frame, a terminal box within which said resistance wire terminates, conductors extending from said terminal box, and a terminal plug to which said conductors are connected.

In witness whereof, I have hereunto subscribed my name in the presence of two witnesses.

HORACE N. PACKARD.

Witnesses:
J. C. WILSON,
F. H. HUBBARD.